United States Patent Office 2,812,233
Patented Nov. 5, 1957

2,812,233
METAL EXTRACTION PROCESS

George W. Lewis, Jr., Roxana, and Donald E. Rhodes, Urbana, Ill., assignors to the United States of America as represented by the United States Atomic Energy Commission No Drawing. Application January 25, 1955, Serial No. 484,085

14 Claims. (Cl. 23—14.5)

This invention deals with the recovery of heavy metal values from aqueous solutions, and in particular with that of uranium values, by solvent extraction.

For the recovery of metal values from aqueous solutions extraction with a substantially water-immiscible organic solvent is one of the most frequently used processes; for instance, uranium values are frequently extracted with diethyl ether. In these extraction processes aqueous raffinates are obtained which mostly still contain some of the metal to be extracted; the salvage of these small quantities, however, is often desirable, particularly in the case of uranium solutions.

It has been tried to recover these last amounts of uranium from aqueous extraction raffinates, before the disposal of the latter, by extraction with a solution of tributyl phosphate in kerosene or carbon tetrachloride. However, these methods were not always satisfactory because an emulsion formed during the contact of aqueous and organic media and phase separation then was rather difficult or sometimes even impossible.

It is an object of this invention to provide a process for the recovery of heavy metal values from aqueous solutions by solvent extraction whereby no emulsification occurs.

It is another object of this invention to provide a process for the recovery of heavy metal values from aqueous solutions by solvent extraction wherein a small volume of extractant only is necessary for the treatment of a comparatively very large volume of aqueous solution.

These objects are accomplished by dissolving an organic water-immiscible complexing agent for the heavy metal to be recovered in a molten wax which is solid at operating temperature, e. g., at room temperature (about 77° F.), cooling the solution formed, mechanically disintegrating the solid solution (hereinafter referred to as "wax complex"), contacting the disintegrated wax complex with the metal-containing aqueous solution to be processed, and separating the metal-containing wax complex from a metal-depleted aqueous waste solution.

As complexing agents those substantially water-immiscible organic compounds are particularly well suitable which contain a phosphorus atom and an oxygen atom bonded directly to the phosphorus atom and wherein the oxygen is capable of donating a pair of electrons to form a coordination bond. For instance, phosphate esters, such as a mixture of mono- and dioleyl phosphoric acid esters containing small contaminating quantities of stearyl and cetyl esters, tributyl phosphate, trioctyl phosphate, dioctyl hydrogen phosphate, octadecyl dihydrogen phosphate, ethyl lauryl acid phosphate, are operative; likewise, alkyl phosphonates, such as bis(2 - ethylhexyl)2 - ethylhexyl phosphonate, and alkyl phosphine oxides, e. g., tri-n-octyl phosphine oxide, are suitable. The preferred complexing agent is tributyl phosphate.

The wax, of course, has to have the proper consistency, and in particular, it has to be solid at operating temperature. The wax also should not be too soft so that the particles obtained after disintegration will not adhere to each other to form large lumps, and it also should not be brittle so that it will not crumble. Microcrystalline petroleum wax, for instance, was found to be more cohesive, elastic and to have a lesser tendency for crumbling than paraffin wax derived from petroleum. An amber microcrystalline wax having a melting point of about 190° F. was found very suitable for batch operation of the process, while a mixture of the same wax with a higher melting wax, for instance one having a melting point of about 288° F., was found better for column operation. Also a polymer of ethylene having a molecular weight of about 2100 and a melting point between about 200 and 220° F. gave very good results.

The wax itself was found not to have any effect on the adsorptive capacity of the complexing agent.

Various methods may be used for preparing the wax complex. For instance, the complexing agent and the wax may be mixed in the desired proportion by melting the wax and the mixture then be cooled for solidification. The wax complex is finally ground to the desired particle size.

In another instance the melted mixture was poured into a sheet of about 2 to 3 mm. thickness which, after cooling, was then cut into small cubes. The melted mixture may also be poured into cold water, preferably ice water, while agitating; by this procedure the complex is obtained in the form of flakes which may then be separated from the water by filtration or the like and air-dried. Another procedure which has been found suitable comprises the immersion of wax pellets or other suitably shaped particles in the liquid complexing agent; for instance, immersion of the polyethylene wax described above in tributyl phosphate at a temperature between 158 and 176° F. for 15 minutes resulted in a satisfactory wax complex.

The particle size of the wax complex may vary widely, but a diameter of the particles ranging between 0.05 and 1 mm. is preferred. As to the various shapes of the particles usable, flakes were found best because they have the largest surface area. Some of the tributyl phosphate wax complexes were examined microscopically, and it was found that the tributyl phosphate was contained in the wax as a separate phase in the form of small spheres of a diameter from 10 to 25 microns; these were uniformly distributed throughout the wax. This was found true in wax complexes containing from 2 to 50% by weight of tributyl phosphate.

The concentration of the complexing agent in the solid wax solution may vary widely, but should be at least 10%; it can be as high as 65% by weight. A content of from 25 to 50%, however, gave the best results.

As has been set forth above, it is desirable that the wax complex be strong so that the particles will not break up into smaller elements during operation. In this respect the polyethylene -tri-n-octyl phosphine oxide mixture containing equal amounts of the two ingredients was found especially satisfactory.

In some cases it has been found advantageous to deposit the wax complex on and/or in an inert reinforcing support. For this purpose wool of Pyrex glass showed good physical properties. Ceramic materials, for instance, one which mainly consisted of alpha Alundum and contained a small percentage of silica and trace amounts of alkalies and alkaline earths were found suitable. In these cases the pellets or other shapes of the support material were placed in an oven, the temperature of which depended upon the melting point of the pellet material, and, when they had the oven temperature, were immersed in the melted wax complex for about 5 minutes. The liquid wax complex was then decanted off and the impregnated pellets were allowed to stand on a hot plate (at 194° F. for an 80% tributyl phosphate-20% microcrystalline wax) for about 10 minutes and finally cooled to room temperature. These wax complex-impregnated shapes were especially useful for continuous operation in columns or beds.

Various types of "feed solutions" may be treated by the process of this invention. Slurries as well as solids-free feeds have been used successfully. The feeds may be devoid of free acid or may contain free mineral acid, such as nitric acid, sulfuric acid or hydrochloric acid. However, with acid-free feeds, better results are obtained if a salting-out agent is present. (A salting-out agent is an inorganic compound which is highly soluble in water and which, when added in sufficient amounts to an aqueous salt solution to be extracted, promotes the interchange of said salt into an organic solvent therefor.) The metal concentration in the feed may vary widely, best results having been obtained, however, with a quantity of 1 to 7 grams per liter.

When a slurry is used as the feed and operation is carried out in a batch process, separation of the solids from the depleted feed is then accomplished with a screen that is coarse enough to let the solids of the slurry through, but fine enough to retain the metal-containing wax complex.

In the case of tributyl phosphate as the complexing agent and uranyl nitrate as the metal salt to be recovered, a minimum molal ratio, for tributyl phosphate:uranyl nitrate, of 2:1 was found to be necessary. This means that for a uranium-containing slurry as it is usually obtained in uranium processing by extraction of a solution containing a solid residue and for a 50:50 tributyl phosphate-wax mixture, at least 1 pound of wax complex is necessary per gallon of slurry.

Room temperature has been found satisfactory, and a contact time of about 1 hour proved sufficient for the process. As has been indicated, the process of this invention is suitable for continuous or batch operation, the continuous process being preferred. The most advantageous way of carrying out the continuous process is by packing columns with the wax complex and flowing the solution to be treated through the columns. In the batch process the feed is preferably slurried with the wax complex particles and after sufficient contact the waste solution is separated from the solid by decantation, flotation, screening, or other means known to those skilled in the art. The wax complex may be contacted with one or several portions of solution. Agitation is advisable to intensify the contact. The use of a bucket or other vessel with a stirring device at its bottom has been found very satisfactory for batch operation; the agitation sucks the wax, which would otherwise float at the top of the feed, into the feed without the agitator contacting the wax and thus without breaking the wax complex into undesirably fine particles.

The metal-containing wax complex can then be treated for recovery of the metal salt adsorbed thereon. For this purpose the wax complex was "stripped" with aqueous media, for instance with water or with sodium carbonate solution or with dilute sulfuric acid. Water was preferable when tributyl phosphate was the complexing agent, while a sodium carbonate solution was preferred for bis-(2-ethylhexyl)2-ethylhexylphosphonate, and sulfuric acid for tri-n-octyl phosphine oxide complex. By this stripping procedure the wax is regenerated, and in some instances the adsorptive capacity of the wax complex is even improved thereby. This was the case, for instance, when stripping was carried out first by treatment with distilled water and thereafter with a 0.5 M sodium carbonate solution. For the purpose of enriching the solution obtained by stripping the aqueous metal solution obtained by stripping is reused for contacting a new portion of metal-containing wax complex, instead of using fresh water each time. Elevated temperature proved better for stripping than room temperature.

Instead of removing the metal values from the wax complex by stripping, the outer, metal-containing layer may be dissolved from the particles, for instance with ether, and the ether solution obtained thereby can be shaken, for instance, with a 1 M sodium carbonate solution, whereby the metal is taken up by said solution while the sodium salt of the complexing agent remains in the interfaces. However, the stripping procedure is preferred because it does not entail a consumption of the wax complex.

In the following, a few examples are given for the purpose of illustrating the process of this invention without the intention to have the invention limited to the details given therein.

EXAMPLE I

A solution was prepared which contained most of the salts usually present in pitchblende-processing solution. This solution was 1 M in sodium nitrate; 0.33 M each in magnesium nitrate, calcium nitrate, nickel nitrate, cobalt nitrate and copper nitrate; 0.17 M each in ferric nitrate and aluminum nitrate and containing 0.95 g. uranyl nitrate per liter of solution. The wax complex consisted of 30% by weight of bis(2-ethylhexyl)2-ethylhexylphosphonate, 35% of microcrystalline petroleum wax having a melting point of about 170° F., a specific gravity at 60° F. of 0.935 and an ASTM color of 1.5+ and 30% of a tan-colored synthetic wax consisting of polyamides of saturated fatty acids, having a melting point of about 288° F., a specific gravity of 0.975 at 77° F. and of 0.830 at the melting point, being insoluble in water and ethyl alcohol but soluble in hot toluol, hot naphtha and hot mineral oil. One hundred grams (on a dry basis) of this wax complex was packed in an 18-mm. wide column. The diameter of the wax complex particles ranged from 0.05 to 0.6 mm., and the flow rate was 0.15 ml. solution per 1 gram of wax per minute. The capacity of the wax in one run until a "leakage" of 10% (leakage is the percentage of feed content remaining in the effluent) was 13.4 mg. of uranium per gram of wax complex.

EXAMPLE II

A quantity of 2200 grams (determined on a dry basis) of a wax complex was used containing 50% by weight of tributyl phosphate and 50% of a microcrystalline petroleum wax having a melting point of about 170° F., a specific gravity at 60° F. of 0.935 and an ASTM color of 1.5+. Four cycles were carried out using uranium-containing slurries which were obtained by processing uranium ore and which had different uranium concentrations for the cycles as is indicated in Table I. Nine liters of feed solution were passed through the wax complex in each cycle and there was no regeneration between cycles. The process was carried out in a batchwise operation using a container which was equipped with an agitator at its bottom; by this arrangement the agitator did not come into direct contact with the wax complex and did not disintegrate it. The uranium content of the solution in each cycle was determined after different contact times. The results are given in Table I.

Table I

| Time of Stirring | Cycle I U, g./l. | Cycle II U, g./l. | Cycle III U, g./l. | Cycle IV U, g./l. |
|---|---|---|---|---|
| 0 (Feed slurry) | 2.2 | 1.2 | 5.0 | 5.3 |
| 15 | 0.10 | 0.17 | 0.14 | 1.3 |
| 30 | 0.09 | 0.04 | 0.05 | 0.38 |
| 60 | 0.009 | | | 0.23 |
| 90 | 0.006 | | | 0.15 |

The wax complex had adsorbed a total of about 55 mg. of uranium per gram of wax complex at the end of cycle IV; the uranium recovery amounted to about 98%.

The wax was then washed with 1500 ml. of a 2 M magnesium nitrate solution in order to remove most of the slurry liquid and solids that had remained on the wax particles. The uranium was then stripped from the wax by subsequently contacting it, while stirring, with two portions of distilled water, a first portion of 5.5 liters and a second portion of 9.0 liters. The aqueous solutions obtained thereby ("strips") were analyzed for their uranium contents after various times of stirring. The results are compiled in Table II.

Table II

| Length of Stirring, min. | Strip I U, g./l. | Strip II U, g./l. |
|---|---|---|
| 0 | 0 | 0 |
| 15 | 5.6 | |
| 30 | 6.6 | 4.1 |
| 60 | 7.3 | 4.6 |
| 120 | 8.7 | 5.5 |
| 180 | 8.8 | |
| 24 hours | 10.0 | 6.2 |

The stripping procedure accomplished a total uranium recovery of about 91% of the uranium originally adsorbed and extraction plus stripping an over-all recovery of about 90%.

EXAMPLE III

Aqueous solutions of uranyl nitrate hexahydrate were contacted with a wax complex containing 50% by weight of tributyl phosphate and 50% of an amber-colored microcrystalline petroleum wax of a melting point of about 190° F. In each case a quantity of 20 grams of this wax complex was contacted with 200 ml. of one of the solutions using a contact time of 24 hours. The uranium distribution is shown in Table III.

Table III

| Run | Conc. U in Wax Complex (mg. U/g.) | Conc. U in Solution (mg. U/ml.) | Ratio,[1] Wax/ Solution |
|---|---|---|---|
| 1 | 67 | 41.0 | 0.16 |
| 2 | 16 | 17.2 | 0.09 |
| 3 | 3.6 | 9.1 | 0.04 |
| 4 | 3.1 | 4.6 | 0.07 |
| 5 | 0.2 | 0.84 | 0.02 |
| 6 | 97.5 | 87.2 | 0.11 |
| 7 | 83.0 | 79.2 | 0.10 |
| 8 | 78.0 | 64.4 | 0.12 |
| 9 | 71.0 | 57.8 | 0.12 |
| 10 | 69.0 | 50.8 | 0.14 |

[1] Ratio, wax/solution=total amount of uranium in wax complex:total amount of uranium in solution.

In another set of experiments 140 ml. of uranyl nitrate-containing solutions were contacted in each case with 8 grams of the same wax used above. The uranyl nitrate solutions, however, contain magnesium, calcium and aluminum nitrates ("background salts") in quantities so as to contribute equally to the background salt content on an ionic strength basis. Four different ionic strength values were tested and each for four different uranium concentrations. The results are given in Table IV.

Table IV

IONIC STRENGTH OF ONE

| mg. U/g. wax complex | mg. U/ml. solution | Ratio, wax shield solution |
|---|---|---|
| 44 | 4.4 | 0.57 |
| 55 | 6.6 | 0.46 |
| 66 | 8.5 | 0.4 |
| 70 | 13 | 0.3 |

IONIC STRENGTH OF THREE

| 50 | 2.2 | 1.3 |
| 67 | 2.7 | 1.4 |
| 72 | 5.2 | 0.8 |
| 87 | 7.6 | 0.6 |

IONIC STRENGTH OF FIVE

| 45 | 0.72 | 3.5 |
| 69 | 1.4 | 2.9 |
| 81 | 2.2 | 2.1 |
| 93 | 4.1 | 1.3 |

IONIC STRENGTH OF SEVEN

| 55 | 0.25 | 12.5 |
| 71 | 0.54 | 7.4 |
| 83 | 1.2 | 4.0 |
| 93 | 2.9 | 1.8 |

It is obvious from these experiments that the presence of salting-out agents improves the extraction and that a higher concentration thereof yields a higher efficiency. It will also be seen from the table that for the same ionic strength of nitrates a better recovery of uranium on the wax is obtained the more dilute the solution is as to uranium. This fact makes the process excellently suitable for the recovery of uranium from waste solutions derived from extraction processes because such solutions usually contain uranium in very minute concentrations.

EXAMPLE IV

Two equal portions (504 grams each) of a tributyl phosphate-wax mixture containing 6.68 grams of uranium adsorbed on a wax complex of 50% by weight of tributyl phosphate and 50% of the same type of synthetic wax as was used in Example I were slurried each in 3780 ml. of water, in one instance at a temperature of 88° F. and in the other instance at 147° F. By this 88.8% of the adsorbed uranium were stripped at 88° F. while complete removal was achieved at 147° F.

It will be understood that, while the process is mainly described in connection with the recovery of uranium, the primary purpose of the invention, the process is equally well applicable to the recovery of other heavy metal, e. g. actinide salts and rare earths salts, from aqueous solutions.

It will also be understood that this invention is not to be limited to the details given herein but that it may be modified within the scope of the appended claims.

What is claimed is:

1. The process of recovering heavy metal values from an aqueous solution, comprising dissolving an organic, substantially water-immiscible complexing agent in a molten wax which is solid at room temperature, said complexing agent having a phosphorus atom and an oxygen atom bonded directly to the phosphorus atom and capable of donating a pair of electrons to form a coordination bond; cooling the wax complex formed; mechanically disintegrating the wax complex; contacting the disintegrated wax complex with said aqueous solution whereby said metal values are taken up by said wax complex; and separating the metal-containing wax complex from a metal-depleted aqueous waste solution.

2. The process of claim 1 wherein the heavy metal is uranium,

3. The process of claim 2 wherein the complexing agent is alkyl phosphate.

4. The process of claim 3 wherein the alkyl phosphate is tributyl phosphate.

5. The process of claim 2 wherein the complexing agent is an alkylphosphonate.

6. The process of claim 5 wherein the alkylphosphonate is bis(2-ethylhexyl)2-ethylhexylphosphonate.

7. The process of recovering heavy metal values from an aqueous solution, comprising dissolving an organic, substantially water-immiscible complexing agent in a molten wax which is solid at room temperature, said complexing agent having a phosphorus atom and an oxygen atom bonded directly to the phosphorus atom and capable of donating a pair of electrons to form a coordination bond; cooling the wax complex formed; mechanically disintegrating the wax complex; contacting the disintegrated wax complex with said aqueous solution whereby said metal values are taken up by said wax complex; separating the metal-containing wax complex from a metal-depleted aqueous waste solution; and back-extracting said heavy metal values with an aqueous medium.

8. The process of claim 7 wherein the complexing agent is tributyl phosphate and the aqueous medium is water.

9. The process of claim 7 wherein the complexing agent is bis(2-ethylhexyl)2-ethylhexylphosphonate and the aqueous medium is a sodium carbonate solution.

10. The process of claim 7 wherein the complexing agent is tri-n-octyl phosphine oxide and the aqueous medium is dilute sulfuric acid.

11. The process of claim 7 wherein back-extraction is carried out by first contacting with water and then with an aqueous sodium carbonate solution.

12. The process of claim 7 wherein back-extraction is carried out at elevated temperature.

13. The process of recovering uranium values from an aqueous uranyl nitrate-containing solution, comprising dissolving 25 to 50 parts by weight of tributyl phosphate in 75 to 50 parts by weight of a molten wax which is solid at room temperature; cooling the wax complex formed thereby; mechanically disintegrating the wax complex; contacting the disintegrated wax complex with said aqueous solution whereby said uranyl nitrate is taken up by said wax complex, the respective quantities of wax complex and aqueous solution corresponding to a molal ratio of at least 2:1 for tributyl phosphate: uranyl nitrate; separating the metal-containing wax complex from a uranium-depleted aqueous waste solution; and back-extracting the uranium values by contacting the wax complex with water.

14. The process of claim 13 wherein the aqueous uranyl nitrate-containing solution is one that forms an emulsion with tributyl phosphate.

No references cited.